Nov. 18, 1941. I. S. SALNIKOV Re. 21,951

PRESSURE CORE BARREL

Original Filed March 8, 1938

INVENTOR.
Ivan S. Salnikov
BY
P. L. Young
ATTORNEY.

Reissued Nov. 18, 1941

Re. 21,951

UNITED STATES PATENT OFFICE 21,951

PRESSURE CORE BARREL

Ivan S. Salnikov, Tulsa, Okla., assignor to Standard Oil Development Company, a corporation of Delaware Original No. 2,213,595, dated September 3, 1940, Serial No. 194,522, March 8, 1938. Application for reissue July 26, 1941, Serial No. 404,211

21 Claims. (Cl. 255—72)

The present invention is directed to apparatus for securing cores from boreholes.

In oil well drilling practice a sample of subsurface rock penetrated in the course of drilling operations is referred to as a core. The operation by which such a sample is obtained in order to ascertain the properties of a given formation is known in the art as coring. The devices employed to collect these cores are known as core barrels and are usually so constructed as to be attached at the lower end of a drill pipe.

The cores obtained by all types of core barrels known at present are essentially similar in the respect that these cores are exposed to a constantly diminishing pressure from the moment the core begins its upward movement until it arrives at the surface. Mineral oil and gas found in subsurface formations are generally under a high pressure which is commonly referred to as the formation pressure. The extent of this pressure depends upon the depth of the formation and in general is proportional to the hydrostatic pressure exerted on the formation in which oil or gas is found. It is a well known fact that when oil or gas bearing formations are exposed to a pressure lower than the formation pressure the oil or gas contained in them has a tendency to expand and leave the formation. Consequently, the reduction in pressure on a core obtained by present methods of coring during its travel to the surface brings about a considerable change in the oil and gas content of the core, thereby rendering the sample unreliable.

The principal object of the present invention is to provide a core barrel so constructed as to make possible the delivery of a core at the surface under the pressure of the formation from which the core is taken.

Further objects and advantages of the present invention will appear from the following detailed description of the accompanying drawing in which Fig. 1 is a vertical section of a core barrel according to the present invention with the parts in coring position;

Figure 2:
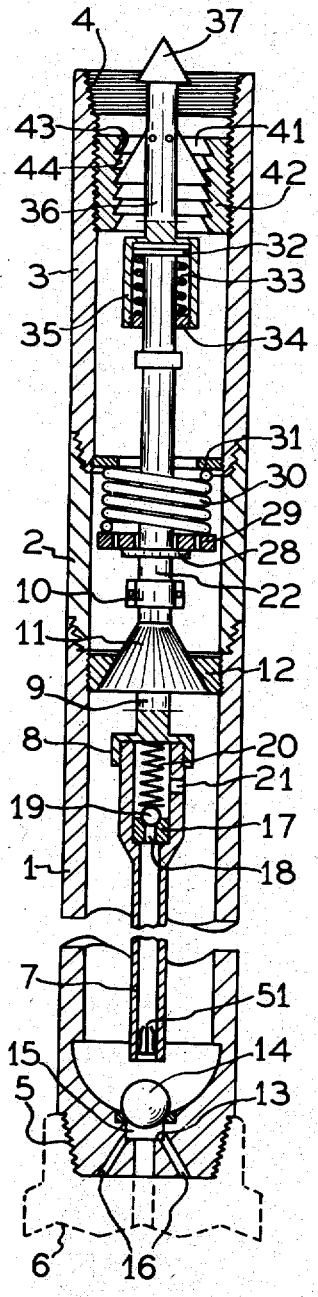
Fig. 2 is a vertical section of the same core barrel with the parts in the position they assume after the core is obtained.

Referring to the drawing in detail, the core barrel of the present invention is shown as being made up of three sections, 1, 2 and 3, threaded together to form a single cylinder. The upper end of section 3 is provided with inner threads 4 to receive the end of a drill stem. The lower end of section 1 is provided with exterior threads 5 to receive a core-bit 6 shown in dotted lines.

Section 1 carries the core barrel 7 which at one end is screwed into a socket 8 carried by a stem 9 which is journaled in coupling 10 and has a frusto-conical section 11 adapted to seat on a flange 12 secured at the upper end of the interior of section 1.

The lower end of barrel 7 is adapted to seat on an annular surface 13 at the lower end of section 1. The lower end of the interior of section 1 is arcuate in shape to provide a run for a ball 14 which is adapted to seat at the opening 15. The lower end of section 1 is provided with passages 16 connecting opening 15 with the exterior at points outside the annular seat 13, for the purpose hereinafter specified.

Arranged in the upper end of barrel 7 is a bushing 17 having a central opening 18 on which is seated a ball 19 held in position by a spring 20. The wall of the barrel above the bushing is perforated as at 21.

Figure 5:
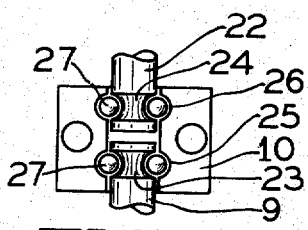
Figure 5 is a detail in section of a journal used in the core barrel.

Also journaled in coupling 10, for rotation independently of stem 9, is a stem 22. As shown in Fig. 5, stem 9 is provided with a circumferential groove 23 near its end and stem 22 is provided with a corresponding groove 24. Coupling 10 has complementary grooves 25 and 26 respectively. Bearings 27 ride in the tracks formed by the complementary grooves.

Stem 22 is provided with a collar 28 which supports a perforated plate 29 of a diameter less than the interior diameter of section 2. Bearing against plate 29 is one end of spring 30, the other end of which bears against an annular ring 31 secured at the lower end of section 3.

The end of stem 22 is provided with a flange 32 which forms a seat for one end of a spring 33, the other end of which is seated on an annular ring 34 carried by a cylinder 35 in which flange 32 rides.

The cylinder 35 is carried at the end of a rod 36 which terminates at its other end in a cone 37 having a base of larger diameter than the rod. Rod 36 is provided with radial grooves 38 in which are pivoted dogs 39, pressed outwardly by springs 40. These dogs have a configuration such as to fit into serrations 41 formed on the inner face of a sleeve 42 mounted on the interior of section 3. Each of these serrations has a flat face 43 and an inclined face 44 whereby the dogs can slide upwardly over the inclined faces but are restrained from reverse motion by the flat faces.

Figure 1:
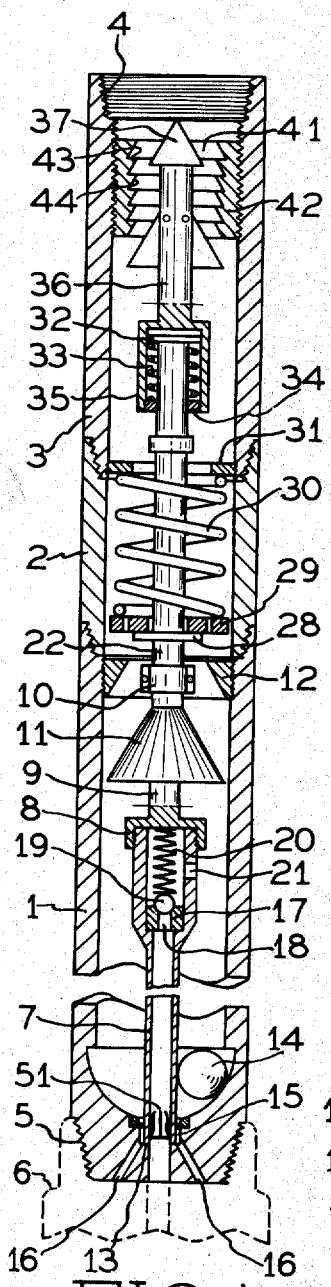
Figure 3:
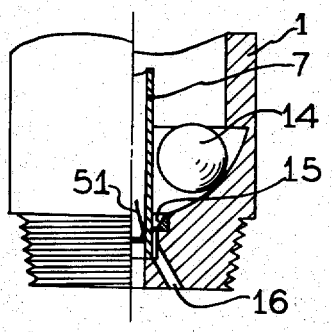
Figure 3 is a detail, partly in section, of the lower end of the core barrel.
Figure 4:
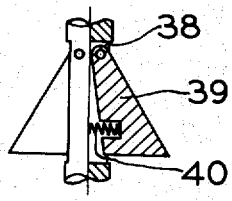
Figure 4 is a detail, partly in section, of a latching mechanism employed in the core barrel.

As previously stated, in Fig. 1 the parts of the core barrel are shown in the position which they assume for the coring operations. It is to be understood that during this operation it is necessary to circulate drilling fluid down through the drill stem around the bit and back to the surface on the outside of the drill stem. With the parts in the position shown in Fig. 1 the drilling fluid flows downwardly through the sleeve 42, through the opening in ring 31 and the opening in ring 12 through opening 15 and passages 16 to the exterior of the drill stem.

When the assembly is lowered into the borehole, which is filled with drilling fluid, barrel 7 becomes filled with drilling fluid. When the formation to be sampled is reached and drilling is begun, the cuttings move upwardly into barrel 7 compressing the fluid in the barrel whereby ball 19 is forced off its seat and the drilling fluid passes out of barrel 7 through perforations 21. When the barrel is filled with cuttings, ball 19 resumes its seat thereby preventing the drilling fluid in section 1 from returning to the interior of the barrel.

During the coring operation, barrel 7 is held on seat 13 by spring 30. When the operation is completed, a wire line carrying jars, a sinker rod and a spear socket is run down the drill stem until the spear socket engages the cone 37. A pull is then exerted on the wire line at the surface to pull up the assembly composed of barrel 7, rod 9, rod 22 and rod 36 until cone 11 is seated on ring 12. Due to the spring connection between rod 36 and stem 22, the dogs 39 can be made to engage with a sufficiently high notch to hold cone 11 firmly on its seat.

The tool releasing assembly composed of a wire line, jars, a sinker rod and a spear socket is well known in the art and is, therefore, not described in detail here. As is known, the spear socket is connected to the rest of the assembly by means of pins which can be sheared off by operating the jars, thereby freeing the spear socket from the rest of the assembly which is then returned to the surface. Accordingly, when cone 11 is seated, the pins on the spear socket are sheared off leaving the spear socket on the core barrel assembly to be recovered when the assembly is brought to the surface at the end of the drill stem.

When the core barrel is removed from its seat 13, ball 14 falls onto its seat 15. As the drill stem containing the core barrel is brought up to the surface, the pressure outside the core barrel assembly decreases steadily while the pressure inside section 1 remains that of the formation. Consequently, ball 14 is held on its seat by the pressure in section 1, whereby, when the assembly is brought to the surface, the interior of section 1 is still at formation pressure. When the assembly is brought to the surface, it can be handled in several ways. Section 1 may be unscrewed from section 2 since stem 9 can rotate relative to stem 22 and the pressure inside section 1 is sufficient to hold cone 11 on its seat. This operation is performed by releasing the dogs 39, unscrewing section 1 from section 2 and removing stem 9 from coupling 10. Section 1 can then be forwarded to a laboratory where its contents can be removed without the loss of any of the volatile constituents contained therein.

Figure 6:
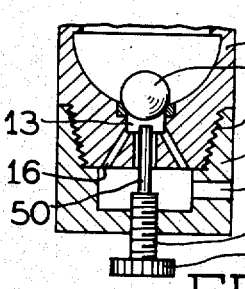
Figure 6 is a vertical section of a device suitable for relieving the pressure on the core in the core barrel without permitting a loss of volatile constituents.

In Fig. 6 is shown one arrangement for recovering those volatile constituents of the core which would ordinarily be lost upon a release of pressure. A cap 45 is provided with interior threads 46 to engage threads 5 at the end of section 1, a threaded part 47 adapted to receive a pipe for leading the recovered material to a separating chamber or any other suitable equipment for recovering volatile constituents, and a screw threaded rod 48 having a head 49 and a point 50.

With cap 45 screwed into place, rod 48 is screwed inwardly until the point 50 pushes ball 14 off its seat, thereby releasing the pressure in section 1 and permitting the fluid contents thereof to flow out of port 47 into the recovery equipment.

In order to insure the retention of the core sample in the barrel 7, it may be desirable to provide resilient fingers 51 at the lower end of the interior of the barrel, these fingers being arranged to extend inwardly and upwardly.

It is apparent that many changes can be made in the above described construction without departing from the basic principles upon which it is based. Many of the elements which are illustrated as separable for the purpose of providing for easy access to the interior of the assembly can be joined integrally. The various coil springs shown can be replaced by other resilient or hydraulic means for accomplishing the same purpose as is well known. Among other features which are capable of modification may be mentioned section 1, which can be made with an internal diameter just sufficiently larger than the exterior diameter of barrel 7 to permit the circulation of drilling fluid.

The nature and objects of the present invention having been thus described and illustrated by a preferred embodiment thereof, what is claimed as new and useful and is desired to be secured by Letters Patent is:

1. A pressure coring device adapted to be connected to the end of a drill stem comprising cutters defining a central passage adapted to receive a core of the formation being drilled, a chamber arranged in said drill stem for communication with said passage, means for effecting relative movement between said chamber and said cutters after the coring operation is completed, and means, operative after said coring operation is completed, for hermetically sealing said chamber under the pressure of the formation.

2. A pressure coring device adapted to be connected to the end of a drill stem comprising cutters defining a central passage adapted to receive a core of the formation being drilled, a chamber arranged in said drill stem for communication with said passage, means for effecting relative longitudinal movement between said chamber and said cutters after the coring operation has been completed, and means, operative after the completion of the coring operation, for hermetically sealing said chamber under the pressure of the formation.

3. A pressure coring device adapted to be connected to the end of a drill stem comprising cutters defining a central passage adapted to receive a core of the formation being drilled, a chamber arranged in said drill stem for communication with said passage, means for effecting relative longitudinal movement between said chamber and said cutters and means, operative after said movement has progressed a predetermined amount, for hermetically sealing said chamber under the pressure of the formation.

4. A pressure coring device adapted to be connected to the end of a drill stem comprising a casing carried by said drill stem, a barrel movably mounted in said casing and adapted to assume a forward position and a retracted position, a cutting head carried by said casing having cutters defining a central passage adapted to receive a core of the formation to be drilled and communicating directly with said barrel when the latter is in its forward position, means for holding said barrel in its forward position during the coring operation, means for retracting said barrel upon completion of the coring operation, and means, operative upon the retraction of said barrel a predetermined amount, for sealing the portion of said casing which carries said barrel under the pressure of the formation being drilled.

5. A pressure coring device adapted to be connected to the end of a drill stem comprising cutters defining a central passage adapted to receive a core of the formation being drilled, a chamber arranged in said drill stem for communication with said passage, means for effecting relative longitudinal movement between said chamber and said cutters and means set into operation by said movement for hermetically sealing said chamber under the pressure of the formation.

6. A pressure coring device adapted to be connected to the end of a drill stem comprising a cutting head having cutters defining a central passage adapted to receive a core of the formation being drilled, a casing arranged in said drill stem behind said cutters, a chamber arranged within said casing for communication with said passage, means for effecting relative longitudinal movement between said chamber and said casing, and means set into operation by said relative longitudinal movement for hermetically sealing said casing under the pressure of the formation being drilled.

7. A pressure coring device adapted to be connected to the end of a drill stem comprising a cutting head provided with cutters defining a passage adapted to receive a core of the formation being drilled, a casing carrying said cutting head, a chamber arranged within said casing for fluid communication therewith and in alignment with said passage, an element arranged for relative longitudinal movement with respect to said casing, means for effecting such movement, and means set into operation by such movement for hermetically sealing that portion of said casing containing said chamber under the pressure of the formation being drilled.

8. A pressure coring device adapted to be connected to the end of a drill stem comprising a casing carried by said drill stem, a barrel movably mounted in said casing and adapted to assume a forward position and a retracted position, a cutting head carried by said casing having cutters defining a central passage adapted to receive a core of the formation to be drilled and communicating directly with said barrel when the latter is in its forward position, means for holding said barrel in its forward position during the coring operation, means for retracting said barrel upon completion of the coring operation, and means set into operation by the retraction of said barrel for sealing the portion of said casing which carries said barrel under the pressure of the formation being drilled.

9. A pressure coring device adapted to be connected to the end of a drill stem comprising a casing carried by said drill stem, a barrel movably mounted in said casing and adapted to assume a forward position and a retracted position, a cutting head carried by said casing having cutters defining a central passage adapted to receive a core of the formation to be drilled and to be in direct communication with said barrel when the latter is in its forward position, means for holding said barrel in its forward position during the coring operation, means for retracting said barrel when the coring operation is completed, means for holding said barrel in its retracted position and means set into operation by the retraction of said barrel for sealing that portion of the casing which carries said barrel under the pressure of the formation being drilled.

10. A pressure coring device adapted to be connected to the end of a drill stem comprising a casing carried by said drill stem, a barrel movably mounted in said casing and adapted to assume a forward position and a retracted position, said barrel having an open forward end, a valve in the rear end of said barrel adapted to permit the flow of fluid only outwardly through said rear end, a cutting head carried by said casing having cutters defining a central passage adapted to receive a core of the formation to be drilled, and communicating directly with said barrel when the latter is in its forward position, means for retracting said barrel when the coring operation is completed, and means set into operation by the retraction of said barrel for sealing that portion of the casing carrying said barrel under the pressure of the formation being drilled.

11. A pressure core barrel adapted to be connected to the end of a drill stem comprising a casing carried by said drill stem, a cutting head carried by said casing having cutters defining a central passage adapted to receive a core of a formation to be drilled, a barrel mounted for longitudinal movement in said casing having an open forward end normally held in position to receive a core through said passage, a fluid connection between the rear of said barrel and said casing, a valve in the rear of said barrel adapted to permit the flow of fluid only from said barrel to said casing, means for withdrawing said barrel longitudinally into said casing upon completion of the coring operation, and means actuated by the withdrawal of said barrel for hermetically sealing said passage.

12. A core barrel assembly comprising a casing adapted to be connected to the end of a drill stem, a seat at the lower end of the interior of said casing defining an opening connecting the interior of said casing to the exterior, a barrel slidingly carried on the inside of said casing adapted to be seated on said seat, a stem connected to said barrel and extending axially of said casing, a collar carried by said casing intermediate its ends and surrounding said stem, means carried by said stem at a point between said collar and the lower end of said casing for coacting with said collar, upon suitable movement of said stem, to seal off the lower end of said casing, means coacting with said stem for forcing said barrel upon its seat during a coring operation, means for moving said stem to a position to seal off the lower end of said casing from the remainder of the casing when the coring operation is completed, whereby said barrel is withdrawn from its seat, and means for sealing the opening at the bottom of said casing when the barrel is withdrawn from its seat.

13. An arrangement, according to the preceding claim, in which the upper attached end of the barrel is perforated, a valve seat is mounted in said barrel below the perforations and a valve is spring-pressed downwardly on said seat, whereby any fluid in said barrel at the beginning of a coring operation may be forced out by the cuttings entering the barrel.

14. A core barrel comprising a chamber, a cylinder, having an open lower end, slidingly arranged therein and movable longitudinally thereof, a valve seat at the bottom of said chamber, a second valve seat at the top of said chamber, means for forcing said cylinder against said first valve seat during the coring operation, whereby said cylinder is connected to the formation undergoing coring to the exclusion of said chamber, means for forcing said cylinder onto said second valve seat at the termination of the coring operation and independent means for closing said first valve seat upon the removal therefrom of said cylinder, whereby, after the coring operation, the chamber carrying the cylinder is sealed.

15. A core barrel comprising a casing adapted to be mounted at the end of a drill stem and to carry a drill bit at its lower end, a stem mounted in said casing for movement longitudinally thereof, an open ended cylinder carried by the lower end of said stem, a seat for the open end of said cylinder at the bottom of said casing defining an opening adapted to lead cuttings from the drill bit into the cylinder when the latter is on its seat, a valve seat carried by said casing at a point above said cylinder, means carried by said stem adapted to seat on said valve seat upon proper movement of said stem to seal off the casing below said seat, means for forcing said cylinder on its seat during the coring operation and means for moving said stem into position to seal off the lower part of said casing.

16. A core barrel comprising a casing adapted to be mounted at the end of a drill stem and to carry a drill bit at its lower end, a pair of coaxial stems coupled for relative rotation arranged for longitudinal movement in said casing, a barrel mounted at the end of the lower stem having its bottom end open, a seat at the bottom end of said casing to receive the open end of said barrel defining an opening in said casing through which cuttings may enter the barrel when it is on its seat, a skirt on said lower stem above said barrel, a seat for said skirt mounted in said casing in a position such that when the skirt is on its seat the barrel is off its seat, a perforated disc carried by said upper stem, an annular ring mounted in said casing above said disc, a coil spring arranged between said disc and annular ring, a flange at the end of said upper stem, a cylinder surrounding said flange and extending downwardly over said stem, a coil spring mounted between said flange and the lower end of said cylinder, a rod extending from the upper end of said cylinder terminating in a flared spear point, dogs, spring-pressed outwardly, pivoted in said rod, notches in the inner wall of the upper end of said casing for cooperating with said dogs, whereby, when said spear head is engaged by a fishing tool and pulled upwardly, the dogs and notches cooperate to prevent rearward motion of said stems and a ball loosely carried by the lower end of said casing for covering the opening defined by the seat for the barrel when the latter is off its seat.

17. An arrangement, according to the preceding claim, in which the upper attached end of the barrel is perforated, a valve seat is mounted in said barrel below the perforations and a valve is spring-pressed downwardly on said seat, whereby any fluid in said barrel at the beginning of a coring operation may be forced out by the cuttings entering the barrel.

18. An arrangement, according to claim 16, in which the parts are so arranged that when the barrel is on its seat, a free path for the flow of fluid is provided through the casing and passages are provided for the flow of fluid out of the casing around the seat for said barrel.

19. A pressure coring device comprising cutters, a central passage between said cutters adapted to receive a core, a chamber arranged in communication with said passage, means for effecting relative longitudinal motion between said chamber and said cutters, and pressure-tight sealing means set into operation by said motion for sealing off both ends of said chamber.

20. A pressure coring device comprising a cutting head having cutters defining a central passage adapted to receive a core, a casing arranged behind said cutters, a chamber arranged within said casing for communication with said passage, means for effecting relative longitudinal motion between said chamber and said casing, and pressure-tight sealing means set into operation by said relative longitudinal movement for sealing the ends of said chamber.

21. A pressure coring device comprising a cutting head provided with cutters defining a passage adapted to receive a core, a casing carrying said cutting head, a chamber arranged within said casing for fluid communcation therewith and in alignment with said passage, an element arranged for relative longitudinal movement with respect to said casing, means for effecting such movement, and pressure-tight sealing means set into operation by such movement for sealing the ends of said chamber.

IVAN S. SALNIKOV.